United States Patent
Klimov et al.

(10) Patent No.: US 7,386,019 B2
(45) Date of Patent: Jun. 10, 2008

(54) LIGHT PULSE GENERATING APPARATUS AND METHOD

(75) Inventors: Igor Klimov, Fahrweid (CH); Hubert Ammann, Zürich (CH)

(73) Assignee: Time-Bandwidth Products AG, Zürich (CH)

( * ) Notice: Subject to any disclaimer, the term of this patent is extended or adjusted under 35 U.S.C. 154(b) by 188 days.

(21) Appl. No.: 11/135,093

(22) Filed: May 23, 2005

(65) Prior Publication Data

US 2006/0262815 A1    Nov. 23, 2006

(51) Int. Cl.
*H01S 3/098* (2006.01)
(52) U.S. Cl. .............................. 372/18; 372/20; 372/25
(58) Field of Classification Search ................. 372/18, 372/20, 25
See application file for complete search history.

(56) References Cited

U.S. PATENT DOCUMENTS

| | | | |
|---|---|---|---|
| 4,896,119 A | 1/1990 | Williamson et al. | |
| 5,434,875 A * | 7/1995 | Rieger et al. ................. | 372/25 |
| 5,491,707 A | 2/1996 | Rieger et al. | |
| 5,546,222 A | 8/1996 | Plaessmann et al. | |
| 5,612,967 A * | 3/1997 | Lai ............................. | 372/22 |
| 5,615,043 A | 3/1997 | Plaessmann et al. | |
| 5,656,186 A | 8/1997 | Mourou et al. | |
| 5,774,489 A | 6/1998 | Moulton et al. | |
| 5,812,308 A | 9/1998 | Kafka et al. | |
| 5,987,049 A | 11/1999 | Weingarten et al. | |
| 6,016,324 A | 1/2000 | Rieger et al. | |
| 6,373,864 B1 | 4/2002 | Georges et al. | |
| 6,466,604 B1 | 10/2002 | Kopf | |
| 6,834,064 B1 | 12/2004 | Paschotta et al. | |
| 2002/0036821 A1 | 3/2002 | Hollemann et al. | |

(Continued)

FOREIGN PATENT DOCUMENTS

DE    10043269    4/2002

(Continued)

OTHER PUBLICATIONS

R. Huber et al., 12-fs pulses from a continuous-wave-pumped 200-nJ Ti:sapphire amplifier at a variable repetition rate as high as 4 MHz, Optics Letters, vol. 28, No. 1, 2003, pp. 2118-2120.

(Continued)

*Primary Examiner*—Minsun Oh Harvey
*Assistant Examiner*—Yuanda Zhang
(74) *Attorney, Agent, or Firm*—Rankin, Hill & Clark LLP

(57) ABSTRACT

An apparatus for generating electromagnetic radiation pulses comprises a mode-locked laser oscillator with an oscillator cavity defining an oscillator beam path, a first gain element, first pumping means for pumping said first gain element, and a mode locker, and being operable to produce a train of seed electromagnetic radiation pulses. Further an optical switch is placed outside of the oscillator beam path and is arranged in a beam path of radiation coupled out from the oscillator, the optical switch operable to couple radiation from a switch input into a switch output during a certain time period or certain time periods. A radiation amplifier is arranged in a beam path of radiation radiated from the switch output. The amplifier includes a second gain element and second pumping means, the second pumping means comprising a continuous-wave pump radiation source.

39 Claims, 3 Drawing Sheets

U.S. PATENT DOCUMENTS

2005/0254533 A1    11/2005    Hollemann et al.

FOREIGN PATENT DOCUMENTS

WO    2004/021528    3/2004

OTHER PUBLICATIONS

Butterworth, S.D., et al.; "High-power quasi-cw laser pulses via high-gain diode-pumped bulk amplifiers"; Optics Communications, North-Holland Publishing Co., Amsterdam, Netherlands; vol. 131, No. 1; Oct. 15, 1996; pp. 84-88; XP004013399.

Forget, S., et al.; "A new 3D multipass amplifier based on Nd:YAG or Nd:YVO4 crystals"; Applied Physics B: Lasers and Optics, Springer International, Berlin, Germany; vol. B75, No. 4-5; Oct. 2002; pp. 481-485; XP002318726.

Pearce, S. et al.; "Performance of a CW pumpled Nd:YVO4 amplifier with kHz pulses"; Optics and Laser Technology; Elsevier Science Publishers BV.; Amsterdam, Netherlands, vol. 35, No. 5; Jul. 2003; pp. 375-379; XP004422080.

Zurl, Rudiger, "Pikosekunden-Ramanspektroskopie nach selektiver Schwingungsanregung"; Martin-Luther-Universital Halle-Wittenberg, Halle (Saale); May 8, 1998; pp. 31-34; Figures 2.3, 2.4; XP002389007.

Snell, Kevin J. et al. High-Average Power, High . . . Cleo 99, CPD1, paper 10, May 27, 1999.

Georges, P. et al. Passively mod-locked diode-pumped . . . Optic Letters vol. 28, No. 19, 2003 pp. 1838-1840.

Morgner, Uwe et al., Period doubling and deterministic . . . Optics Express pp. 1759-1768 vol. 12, No. 8, 2004.

Lenzner, M. et al. Sub-20-fs, kilohertz-repetition-rate . . . Optics Letters vol. 20, No. 12, 1995, pp. 1397-1399.

Dausinger et al. Micro-machining with ultrashort . . . Proc. SPIE vol. 5147, pp. 106-115, ALT'02 International Conference on Advanced laser Technologies, Weber, Heinz P. et al Eds, Nov. 2003.

Forget, S. et al. New 3D . . . OSA TOPS, vol. 68, ASSL 2002, pp. 321-323.

Muller, D. et al. Thin disk multi . . . OSA TOPS, vol. 83, ASSL, 2003 pp. 278-284.

\* cited by examiner

LIGHT PULSE GENERATING APPARATUS AND METHOD

FIELD OF THE INVENTION

The invention is in the field of generating electromagnetic radiation pulses. It more particularly relates to an apparatus and a method for generating high energy electromagnetic radiation pulses including a master oscillator and at least one amplifier. The invention also relates to a radiation amplifier.

BACKGROUND OF THE INVENTION

Applications of pulsed electromagnetic radiation sources (primarily infrared light or visible light but also ultraviolet radiation) such as material processing or precision micro machining offer improved performance with higher fluence (energy per area) and peak intensity (energy per time per area). Such pulse parameters result in better laser micromachining performance, i.e. the material can be readily ablated with improved spatial precision and a reduction in material damage of nearby areas (so-called "cold ablation" resulting in a reduced heat-affected zone around the area of the ablated material). A further performance influencing parameter is the pulse repetition rate. In material processing applications, processing speed generally scales linearly with the repetition rate.

Therefore, radiation sources of coherent radiation combining the following properties would be desirable:
- short optical pulses, in the range of picoseconds (preferably around 10-15 ps, often more than 20 ps, but even down into femtoseconds)
- high pulse energies (preferably 100 microjoules or more)
- high repetition rate (ideally 100 kHz or more)
- preferably near diffraction limited spatial profiles (to allow for near-diffraction limited focusing to beam spot size diameters on the order of the laser wavelength i.e. one micron approximately)
- if possible, readily adjustable repetition rate, over a range of pulse repletion rates, preferably from a minimum to maximum ratio of at least 4× (i.e., for example 50 kHz to 200 kHz) without having to substantially re-align or re-adjust the laser or amplifier, and while still maintaining good spatial beam properties, preferably without substantially changing key beam properties (M2, beam waist, beam divergence).

These requirements are also beneficial if shorter wavelengths are required, because nonlinear frequency conversion efficiency increases with increasing peak intensity and with good spatial beam qualities. Shorter wavelengths (i.e. frequency doubling, tripling, quadrupling, or quintupling) decrease the potential spot size for diffraction-limited focused beams, and can improve the material processing performance for different materials, since the shorter-wavelength light has higher photon energy, resulting in different and improved ablative performance (for example in transparent materials).

Current state-of-the art diode-pumped solid-state lasers can be passively mode-locked to produce, in a simple and robust way, picosecond and femtosecond optical pulses, as, for example, disclosed in U.S. Pat. No. 5,987,049. These lasers typically produce optical pulses with low pulse energy (10-100 nJ) but at high repetition rates (e.g. 100 MHz). Also, mode-locked high power lasers have been known, for example, from U.S. Pat. No. 6,834,064. However, the achievable pulse energies of these high power pulsed lasers are in the low microjoule range, which is still not enough for the initially mentioned applications.

As an alternative to high power lasers, it has been suggested to combine a mode-locked laser oscillator with an amplifier. Several embodiments of continuous-wave diode-pumped multi-pass amplifiers have been described, for example, in U.S. Pat. No. 5,546,222, U.S. Pat. No. 5,615,043, U.S. Pat. No. 5,774,489. By this technique, the average output power can be amplified considerably, even to many tens of Watts if a plurality of amplification stages are applied. However, due to the high repetition rate of the initial oscillator, the pulse energies remain below 1 µJ. An even higher average power is not desirable due to disadvantages entailed by high average power, such as potential thermal fracture, thermal lens effects, complex set up involving a multitude of pump diodes, a sophisticated heat management, high power consumption etc. Also, repetition rates exceeding some tens of MHz or hundreds of MHz may be disadvantageous since they are difficult to handle for some material processing applications. The most desirable range would be between 100 KHz and 4 to 10 MHz. However, decreasing the repetition rate of the initial oscillator would mean to increase the cavity length, which is usually not desired, since the oscillator would become physically very large or require a complex folding technique, which results in optical loss and reduced mechanical stability.

An alternative approach to decreasing the pulse repetition rate and at the same time increasing the pulse energy is "cavity dumping". This technique comprises inserting an optical switch (typically electro-optic or acousto-optic) into the laser cavity and reducing the normal output coupling of the laser through the output-coupling mirror to as little as possible. This allows the intracavity pulse energy to increase. Occasionally, an intracavity pulse is switched out at a reduced repetition rate (typically over the range from single shot to megahertz pulse rates) but at increased pulse energy compared to the normal continuous operation of the laser. Such a cavity dumped laser can typically get ten times higher pulse energies, but the pulse energy typically becomes independent on the dumping frequency below a few MHz, so that further reductions in the repetition rate do not result in a pulse energy gain. Also, switching is inherently critical. Any misalignment of the intracavity beam with respect to the switching apparatus changes the output coupling and therefore the laser dynamics, the circulating pulse energy, etc. Further, cavity dumping perturbs the laser dynamics, since the leftover pulse has a smaller than equilibrium pulse energy, resulting in non-steady state performance. All this may lead to higher pulse-to-pulse fluctuations than in continuously mode-locked lasers, and even chaotic pulse performance.

Even if these stability problems are somehow overcome, the pulse energies are still not sufficient. It has therefore been proposed (for example Huber et al., Optics Letters 28, p. 2118 (2003)) to combine a cavity-dumped laser with a 2-pass pass continuously pumped amplifier. However, such an approach did also not result in sufficient maximum pulse energy, since the given gain material to be chosen under the given boundary conditions have a very low gain, as a consequence of which tight focusing is required. This leads to strong gain saturation (depletion) at low pulse energies. More in general, it has proven to be difficult to achieve a continuously pumped, high-gain multi-pass amplifier, and there are significant trade-offs between high total gain and high average power output.

Higher gain can be achieved in a spatial multi-pass approach if the pump power is increased. However, because of thermal problems, which are similar to the problems encountered in continuously pumped high-power lasers, this is only possible in a pulsed pump scheme at low repetition rate. An example of this state of the art may be found in Lenzner et al., Optics letters 20, p. 1397 (1995), where a TiSa mode-locked laser has been combined with a Pockels cell selecting single pulses from a 80-MHz-pulse train at a repetition rate between 1 kHz and 5 kHz and a pulsed-radiation pumped amplifier. The achieved radiation rates are not fast enough for high-speed material processing as required in industrial applications. Alternatively, systems have been proposed (for example in U.S. Pat. No. 5,812, 308), where the amplifier does not have a high small-signal gain but is seeded with a high-average power oscillator and serves more as a power amplifier to increase the average power by a factor 2-4.

Yet another approach to achieve the high total gain is a regenerative amplifier, where a pulse is trapped in an amplifier cavity, and is re-circulated many times until the pulse energy has grown to where the gain material is effectively saturated. Such a regenerative amplifier has for example been disclosed in U.S. Pat. No. 4,896,119. However, since such regenerative amplifiers comprise a cavity, the misalignment sensitivity is comparably high and chaotic instabilities result in a limited range of repetition rates. Further, the optical switch has to be an electro-optic Pockels cell (acousto-optic modulators are normally not suitable due to the small beam size that would be required in them for fast switching, which would result in peak intensities, due to the high intracavity pulse energy, in the device that exceed their damage threshold). This brings about the necessity for high voltages in the system and as a consequence high-power electronics with all its disadvantages. Also, the switch is alignment-sensitive, the achievable repetition rates are limited, and it is not straightforward to change the repetition rate because the repetition rate influences the roundtrip gain and thermal lens effects, hence the optical performance.

SUMMARY OF THE INVENTION

In view of the state of the art, it is an object of the invention to provide an apparatus for generating pulsed electromagnetic radiation with high pulse energy. It is another object of the invention to provide an apparatus for generating pulsed electromagnetic radiation with high average output power and repetition rates substantially between 50 kHz and 8 MHz. Yet another object of the invention is to provide an apparatus for generating pulsed electromagnetic radiation with a tunable repetition rate where the tuning of the repetition rate does not necessitate the adjustment of geometrical parameters and does not alter the spatial beam parameters.

It is a further object to provide an apparatus for generating pulsed electromagnetic radiation, which apparatus is less sensitive to different parameters (such as outside temperature, chosen calibration parameters, chosen repetition rate etc.) than prior art apparatuses. It is yet a further object of the invention to provide a robust continuously pumped radiation power amplifier with a high small-signal gain.

According to a first aspect of the invention, there is provided an apparatus for generating electromagnetic radiation pulses comprising a mode-locked laser oscillator comprising an oscillator cavity defining an oscillator beam path, a first gain element, first pumping means for pumping said first gain element, and a mode locker, and being operable to produce a train of seed electromagnetic radiation pulses, an optical switch placed outside of the oscillator beam path and being arranged in a beam path of radiation coupled out from the oscillator, the optical switch operable to couple radiation from a switch input into a switch output during a certain time period or certain time periods, and a radiation amplifier including a second gain element, the radiation amplifier being arranged in a beam path of radiation radiated from the switch output, the radiation amplifier further including second pumping means, the second pumping means comprising a continuous-wave pump radiation source.

The inventors have surprisingly found that it is possible, by this combination of features, to obtain a pulsed radiation source with pulse energies high enough to fulfil many requirements of high energy pulse radiation sources, even with continuous-wave (cw) pumping.

The approach according to the invention allows for a compact set-up without too many folds of a cavity, since despite the comparably high pulse-to-pulse time period, no long optical paths are necessary (which would be necessary for a small repetition rate seed laser). The fact that the optical switch (the "picker") is placed outside the cavity leads to the possibility of having a robust seed laser which is not influenced by any operating conditions of the apparatus. The robustness is supported by the pump radiation source being of the continuous-wave type.

Additionally, it has been found that this simple multi-pass approach to amplification results in very clean, high-performance spatial mode properties of the amplified output, which is a very important characteristic for nonlinear optics and material processing. Also, the approach substantially conserves the pulse nature of the input (for example picosecond) pulses produced by the laser oscillator. Some pulse broadening is expected from the well-known phenomena of "gain narrowing". As an example, it has been observed seed pulses of 7 ps result in an output pulse of less than 12 ps, which is close to the expected value based on gain-narrowing calculations.

The mode locker may be any known or yet to be developed mode locking means. It may, for example, be a passive mode locker such as an element comprising a saturable absorber material or a Kerr lens mode locking means, possibly an additive-pulse mode locking means, or other. It may also be an active mode locker such as a mode locker comprising an acousto-optic or electro-optic coupler.

The first pumping means may be any known pump of a pulsed laser, such as an optical pump including at least one flashlamp, at least one non-lasing diode, at least one superluminescent diode, at least one laser diode or at least one other laser, or combinations of these. It may also be an electrical discharge pump, a gas dynamic expansion pump (if the first gain element is a gas), a chemical pump, or a current injection pump (if the first gain element is a semiconductor gain element), all these pumps being as such known in the art. Especially preferred is the situation where the first gain element is a solid state gain element and the pump is an optical pump, especially an optical pump comprising at least one diode laser.

The term "seed pulses" denoting the pulses output by the laser oscillator does not imply special properties of these pulses but merely relates to their function as being pulses selectively input to the radiation amplifier. The seed pulses may have any properties concerning wavelength, pulsewidth, pulse repetition rate, pulse shape, pulse energy etc.

The optical switch couples the incident radiation or a fraction thereof from an input to an output during a certain time period or certain time periods which period/periods are for example defined by switching signals. As an example, the optical switch may direct radiation either in a first or a second direction, the first direction corresponding to the switch output. The optical switch may be any known or yet to be developed switch, such as an electro-optical switch (including a Pockels cell), a magneto-optical switch or an acousto-optical switch. Especially preferred is the embodiment where the switch is acousto-optical. This is possible since the pulse energy and average power of the seed radiation pulses need not be excessive. Seed laser oscillator and optical switch can then produce any pulse repetition rate which is an integer division of the fundamental repetition rate of the seed laser oscillator. For example, an 80 MHz seed oscillator can be conveniently adjusted to produce pulses at 40/20/10/5/2.5/1.25 MHz etc. Other repetition rates can be generated by recognizing that the final pulse separation of the output pulse train must simply be some integer multiple of the pulse separation of the seed oscillator (for the case of 80 MHz corresponding to 12.5 ns). This allows for many selectable repetition rates, for example exactly 1.0 MHz, or 1.013 MHz above or 0.988 MHz below. Other seed oscillator repetition rates may be chosen to obtain other desired selectable repetition rates.

The radiation amplifier is preferably non-regenerative, i.e. does not form a cavity and is in most cases free of an optical switch. Preferably, it is a multi-pass amplifier. A multi-pass amplifier in this context denotes a spatial multi-pass amplifier. This is in contrast to temporal multi-pass amplifiers (regenerative amplifiers) where the amplifier comprises a cavity, in which the radiation pulsed circulate a number of times, and where the radiation is coupled out by an active switching means. In a spatial multi-pass amplifier the gain element is traversed by the beam amplifier beam path a plurality of times. In the spatial multi-pass amplifier, in contrast to regenerative amplifiers, the gain element is passed a plurality of times due to the geometrical set-up and possibly also due to polarization influencing means such as polarization filters and/or polarization rotators. This may be viewed as spatial multiplexing in contrast to the temporal multiplexing of regenerative amplifiers. The preferred number of passes is at least four, but it may also be only two or three passes, or at least five or six, at least seven or eight, or an uneven number etc.

The second gain element may be a gain element of any known or yet to be discovered kind but is preferably a solid-state gain element, especially preferred a Nd doped gain element. Nd doped gain elements were so far usually not considered to be suitable for amplifiers of pulsed radiation generated by mode-locked lasers, since they do not have the bandwidth to support ultrashort (femtosecond) pulses. However, it has been found that for the picosecond pulsewidths required for certain applications, they are suitable and may provide an excellent small signal gain. The currently preferred material is Nd:Vanadate.

The multi-pass amplifier approach according to the invention can lead a very-high small-signal gain, and allows for amplification of individual pulses from approximately 10 nJ input pulse energy to substantially above 1 microjoule or more.

The second pumping means may be any continuously radiating light source, for example one of the continuous-wave light sources mentioned above referring to the first pumping means. Especially preferred is a laser diode or a plurality of laser diodes.

The seed electromagnetic laser pulses produced by the mode-locked laser oscillator preferably have laser pulses of pulse lengths between 1 ps and 1 ns, although also shorter or longer pulse lengths are possible (for Q-switched seed lasers also considerably longer pulses, even up to 1 µs, are possible). The pulse repetition rate of the train of seed electromagnetic radiation pulses may be almost arbitrarily chosen to optimize the geometry of the laser oscillator according to any chosen criteria, such as required space, useable components etc. It may, for example, be in a region between 20 MHz and 200 MHz because these repetition rates are fundamental repetition rates of cavities that have easy-to-handle dimensions. The rate with which the optical switch couples a selected pulse into the amplifier may, for example, be between 50 kHz and 8 MHz.

According to a special embodiment of the invention, the apparatus comprises, downstream of the radiation amplifier, a power radiation amplifier. The power radiation amplifier comprises a third gain element and third pumping means. The third pumping means may again comprise an optical pump, such as a cw optical pump, especially at least one laser diode. The power radiation amplifier may also be a multi-pass amplifier, the number of passes being at least two or at least three or four. The power radiation amplifier may for example be laid out in a similar manner as the radiation amplifier or may even be identical with the latter. The wording "power radiation amplifier" does not imply special physical properties and is not a quantitative statement about the power of radiation of input in the power radiation amplifier or output therefrom. It merely relates to the function of the amplifier, i.e. to further increase the energy of radiation pulses already amplified by the radiation amplifier.

In one preferred embodiment, a high-gain multi-pass first amplifier, using 8-passes through the gain medium, is combined with a lower-gain power amplifier, using 4-passes through a second gain medium. Combining a pre-amplifier for high small-signal gain, and a post-amplifier for further gain at high pulse energy and high average power, one can achieve substantially more than 100 microjoule output pulse energy, at high pulse repetition rates (100 kHz or more).

Preferably, the apparatus comprises repetition frequency tuning means by which the user may select a desired repetition frequency out of a range of repetition frequencies. The frequency tuning means may include a user interface as well as a communication module operable to interact with a controller of the optical switch. The repetition rate may preferably be tuned without changing the position of cavity elements of the laser oscillator and without changing other geometrical parameters. In fact, in a preferred embodiment, the approach according to the invention allows tuning of the repetition rate without changing any parameters other than the switching rate of the optical switch followed by proportional change of the output pulse energy. This is especially the case in combination with the power radiation amplifier which may be operated in saturation where relatively large changes of the seed radiation average power causes only small changes of the output radiation power. For example, in a preferred embodiment, tuning of the pulse repetition rate from 100 kHz to 1000 kHz results in an increase of the seed beam power by a factor of ten, then directed by the optical switch towards the first radiation amplifier (1000% boost), while the amplified power after the power radiation amplifier is increased by only 10%.

Also according to the invention, a radiation pulse generator is provided, the radiation pulse generator comprising
- a pulsed seed laser operable to produce a train of seed electromagnetic radiation pulses,
- an optical switch placed in a beam path of radiation output from the seed laser, the optical switch operable to couple radiation from a switch input into a switch output during a certain time period or certain time periods, and
- a radiation amplifier including a second gain element being a solid-state gain element which includes an Nd dopant, the radiation amplifier being arranged in a beam path of radiation from the switch output, the radiation amplifier further including second pumping means, the second pumping means comprising a continuous-wave pump radiation source, the pump radiation source including at least one laser diode.

Further, the invention concerns an apparatus for generating electromagnetic radiation pulses including
- a mode-locked laser oscillator comprising an oscillator cavity defining an oscillator beam path, a first gain element, first pumping means for pumping said first gain element, and a mode locker, and being operable to produce a train of seed electromagnetic radiation pulses,
- an optical switch placed outside of the oscillator beam path and being arranged in a beam path of radiation coupled out from the oscillator, the optical switch comprising an acousto-optical modulator and being operable to direct radiation either in a first or a second radiation direction,
- a spatial multi-pass radiation amplifier including a second gain element being a Nd:Vanadate gain element, the radiation amplifier being arranged in a beam path of radiation radiated from the optical switch in the first direction, the radiation amplifier further including second pumping means, the second pumping means comprising a continuous-wave pump radiation source, the pump radiation source comprising at least one laser diode, and
- a spatial multi-pass power radiation amplifier including a third gain element and a continuous-wave optical pump for pumping said third gain element, the power radiation amplifier being arranged in a beam path of radiation output from the radiation amplifier.

According to a second aspect of the invention an apparatus for generating electromagnetic radiation pulses includes
- a mode-locked laser oscillator comprising an oscillator cavity, a first gain element, first pumping means for pumping said first gain element, and a mode locker,
- a radiation amplifier including a second gain element, which second gain element includes Nd doped gain material, the radiation amplifier further including second pumping means, the second pumping means including a continuous-wave pumping radiation source, and
- an optical switch, the optical switch operable to couple seed radiation pulses from the laser oscillator into the radiation amplifier.

Again, the second pumping means may include any known cw optical pump but preferably includes at least one laser diode. The invention according to the second aspect thereof also distinguishes, according to preferred embodiments, from the state of the art in that the radiation pulses have a pulsewidth between 1 ps and 1 ns (or longer for Q-switched seed lasers) and in that the second gain material does not include any active cooling means (such as cooling with a flowing liquid or flowing gas, Peltier cooling etc.) in direct contact with the gain element; "absent any active cooling means" does not exclude the gain element being attached to a cooled element, such as a water cooled gain element holder.

A method of generating high-energy electromagnetic radiation pulses includes the following steps
- generating a train of seed electromagnetic radiation pulses, of a first pulse repetition frequency,
- picking a fraction of pulses from said train of seed electromagnetic radiation pulses, said fraction of pulses having a second pulse repetition frequency being smaller than the first pulse repetition frequency,
- continuously irradiating a doped solid by pump electromagnetic radiation,
- directing said fraction of pulses onto said doped solid, so that said doped solid is traversed by said fraction of pulses, and
- re-directing said fraction of pulses so that the doped solid is traversed by the fraction of pulses at least one further time, wherein the fraction of pulses traverses the doped solid on a non-closed path.

"Non-closed path" denotes setups where the beam is not directed in a cavity. A cavity—defining a closed path—is characterized in that radiation therein travels back and forth between end elements or travels around (circular cavity) an undefined number of times, so that light is only coupled out through partially transparent mirrors or upon incidence of certain events (cavity dumping, by an optical switch). On a non-closed path, the travelling light only passes the gain element a pre-defined number (which, however, may depend on parameters such as polarization, wavelength etc.) of times. Especially preferred is an embodiment, where—in contrast to set-ups according to the state of the art, the closed beam path is 2D, i.e. the beam on all passes lies in a single plane.

An amplifier for producing a train of amplified electromagnetic radiation pulses upon incidence of a train of seed electromagnetic radiation pulses includes a radiation directing arrangement defining a radiation entry and a radiation exit, a gain element and continuous-wave optical pumping means operable to optically pump the gain element, the radiation directing arrangement operable to direct incident radiation onto the gain element and to re-direct, on a non-closed path, radiation at least after a first traversal of the gain element onto the gain element, the gain element forming, in an operational state, a thermal lens, wherein a beam waist of a radiation beam directed by the radiation directing arrangement comprises a beam waist outside of the gain material. Preferably, thus, at least one beam waist of the radiation beam is at a place different from the place of focus of the pumping beam (which place of focus is preferably in the gain material).

The gain element is preferably an Nd doped solid, especially a Nd:Vanadate.

BRIEF DESCRIPTION OF THE DRAWINGS

In the following, embodiments of the invention are described with reference to schematic drawings.

DESCRIPTION OF THE PREFERRED EMBODIMENTS

Figure 1:
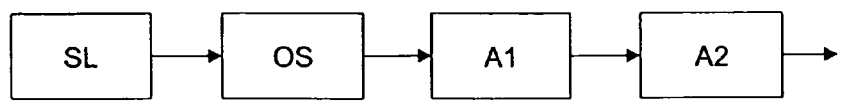
FIG. 1 is a block diagram of an apparatus according to the invention.

An embodiment of an apparatus in accordance with the first and the second aspect of the invention comprises the following components shown in FIG. 1: A seed laser oscillator SL, an optical Switch OS, a first amplifier A1, and a second amplifier A2. A laser pulse produced by the seed laser traverses the optical switch serving as pulse picker. The optical switch either selects the pulse or discards it. The selected pulses then consecutively traverse the first and the second amplifier.

The seed laser may be a compact, industrial-style, 1 W average output power, 100 MHz-range repetition rate oscillator optically cw-pumped with a laser diode and mode-locked with semiconductor saturable absorber device. The seed laser gain element—the first gain element in this text—may be any gain element known for mode-locked pulsed lasers, especially lasers producing pulses of about 1 ps to 1 µs pulse length. It may be a laser Nd doped solid, for example a Vanadate (such as Nd:YVO4 or Nd:GdVO4) crystal.

The laser oscillator repetition rate is defined by the cavity length and optimized for the best performance together with subsequent optical switch.

The output $TEM_{00}$ beam is coupled out the cavity with an output coupler mirror of an outcoupling transparency of for example 5%. The pump diode and laser crystal are for example temperature stabilized.

Due to cw-pumping, temperature stabilization and lack of any movable and switchable components (both mechanically and electro-optically or acousto-optically) inside the cavity the seed laser generates a continuous train of the picosecond pulses which are very stable both in amplitude (<0.1% rms typically) and repetition rate. Additionally the oscillator can be synchronized with an external clock with low timing jitter (<200 fs rms typically).

Individual pulses are selected after the oscillator with an external fast optical switch, which can operate in a range from on a single-shot basis up to at least several megahertz.

Preferably, the optical switch comprises an acousto-optical modulator (rather than an electro-optic modulator) and is placed outside (rather than inside) the seed cavity as an optical switch (pulse picker) for the apparatus according to the invention. This brings about the advantages of compactness, no need for high voltage electronics, lack of influence on the seed laser performance in the whole range of possible pulse repetition rates, a wide range of the repetition rates from single shots up to for example 8 MHz. Further, the spatial separation of the high frequency beam from the seed cavity and low frequency beam deviated on the Bragg angle by the acousto-optical modulator towards an amplifier allows high contrast and minimizes a feedback between an amplifier and seed cavity.

The minimum distance between the seed cavity and the acousto-optical modulator is defined by:

i) The requirement that the seed beam is preferably focused by means of focusing lens or focusing mirror into the acousto-optical modulator with certain waist diameter in order to reach as high efficiency of pulse picking as possible ii) Certain minimum distance between the focusing lens or focusing mirror and acousto-optical modulator due to geometrical factors and constraints.

iii) The beam directed by acousto-optical modulator towards an amplifier may be diverging. If it is, it is advantageously collimated with a certain beam diameter defined by the input characteristics of the amplifier.

The pre-amplifier and the power amplifier are described in more detail further below.

Figure 2:
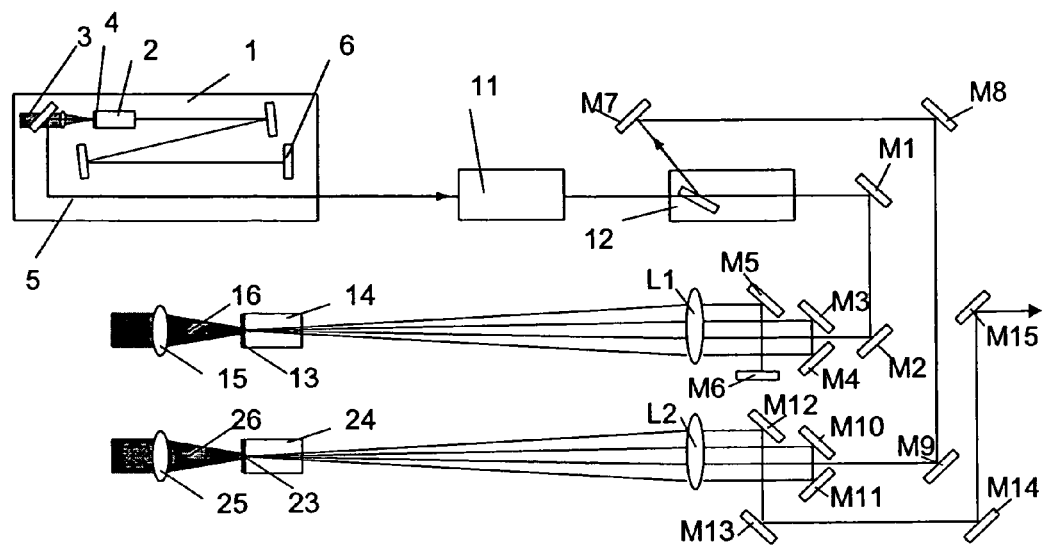
FIG. 2 is a diagram of an embodiment of an apparatus according to the invention comprising two amplification stages.

FIG. 2 shows an example of an apparatus according to FIG. 1 in somewhat more detail. The seed laser is shown including an optically pumped first gain element 2 including a coating 4 which is highly transparent for pump radiation 3 and partially transmittive for laser radiation 5. An end mirror 6 of the cavity may comprise the saturable absorber material responsible for mode-locking. The seed pulses are coupled out through the partially transmittive facet of the first gain element and reach the optical switch 11. The selected pulses are directed, via Mirrors M1, M2, to the first amplifier which comprises a Faraday isolator 12, a radiation deflection arrangement comprising a plurality of mirrors M3-M6, and a lens L1, as well as a second gain element 14 coated by a reflection layer 13 and second pumping means including a laser diode or a bar or an array of laser diodes (not shown) and a pump radiation focusing lens 15 for focusing the pumping radiation 16 into the second gain element. The orientation of the second gain element (being a crystal) and the polarization of radiation hitting it may have to be adjusted to each other, either by adapting the gain element's orientation to the polarization provided after the Faraday isolator 12 or by providing separate (not shown) polarization influencing means such as half-wave plates etc. From the first amplifier, the pre-amplified pulses propagate to the second amplifier, via mirrors M7, M8, and M9. The second amplifier also comprises a light deflection arrangement including a plurality of mirrors M10-M12 and a lens L2 as well as a third gain element 24 coated by a reflection layer 23 and third pumping means including a laser diode or a bar or an array of laser diodes (not shown) and a pump radiation focusing lens 25 for focusing the pumping radiation 26 into the third gain element.

Output mirrors M13-M15 serve for directing the output beam to the desired direction.

An especially preferred radiation amplifier was found to meet the following requirements:

i) To keep the Gaussian beam diameters large enough in order to avoid any bulk or surface optical damage caused by the high radiation intensity (power per area);

ii) To keep input/output Gaussian beams preferably collimated with diameters small enough in order to use low aperture steering (mirrors) and transmitting (lenses, isolators etc.) optics;

iii) To use as little optical components as possible (no additional beam expanders, compressors etc.);

iv) To use as simple components as possible (no parabolic optics, no cemented lenses, no complex objectives, only spherical singlets, flat mirror etc.);

v) To have as compact and robust optical scheme as possible with as short working distances as possible;
vi) To keep a defined polarization state of the seed radiation corresponding to the spatial orientation of the optical axes of an anisotropic gain element employed;
vii) To employ when possible both spatial and polarization dependent separation of the beams in order to minimize overall dimensions of the amplifier; and
viii) To have easy, reasonable and predictable adjustment procedure.

Figure 3:
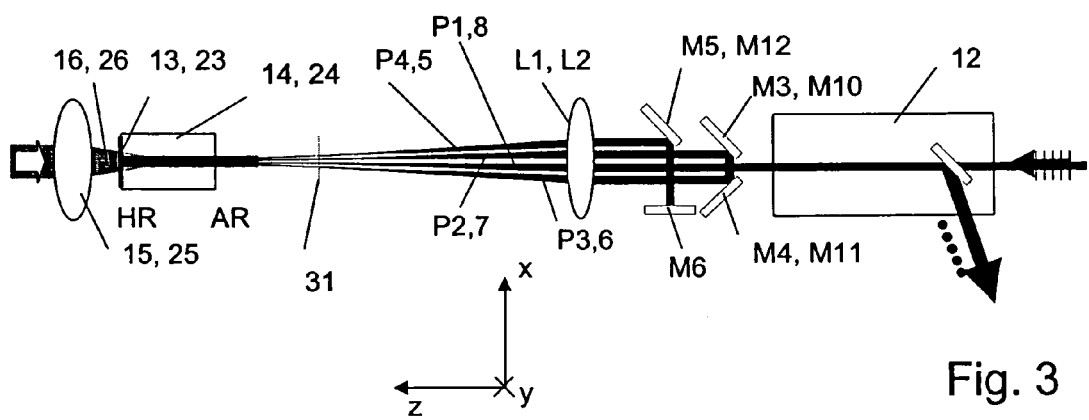
FIG. 3 is a diagram of an amplifier according to the invention.
Figure 4:
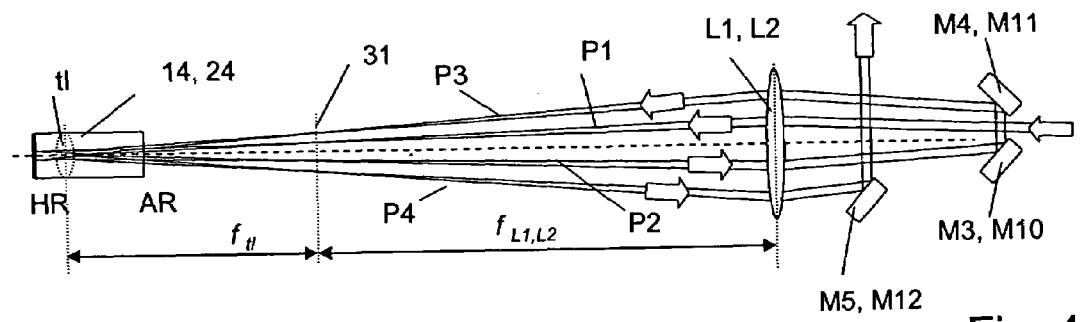
FIG. 4 is a clarifying drawing of the optical path scheme in an amplifier according to the invention.
Figure 5:
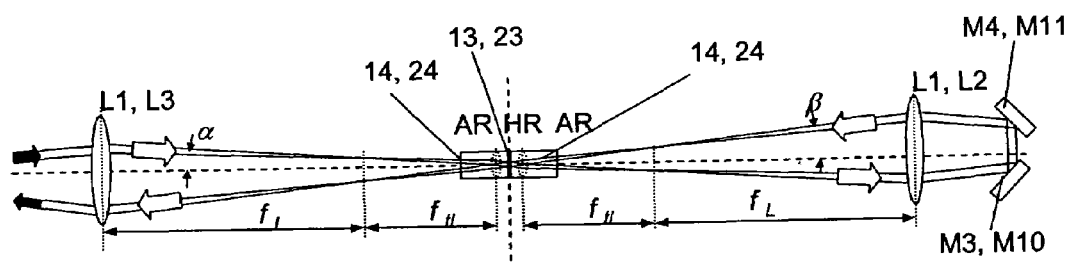
FIG. 5 is a drawing of an unfolded optical path scheme.

The function principle of both, the first and the second amplifier is described in more detail referring to FIGS. 3, 4 and 5. Note that in FIG. 4 as well as in FIG. 5, the elements are shown in an upside-down arrangement compared to FIG. 3. In these figures, elements that appear in both the first and the second amplifier are provided with the two reference numerals. Firstly, only the principle of the first amplifier is described. The first amplifier is an 8-pass amplifier and serves for boosting the energy of the pulses selected by the optical switch 11 from the level of a few nanojoules to a few microjoules with an overall gain coefficient of more than 500 or more than 1000, in some embodiments even more than 5000. The gain element 14 is a cw-end-pumped Nd:YVO$_4$ gain crystal. The crystal is provided with a high reflection coating 13 for the pulsed radiation wavelength, which coating has the effect of an antireflecting coating for the longer wavelength pumping radiation 16. The coating 13 is on the pumping side, whereas the crystal is antireflection (AR) coated on the face side.

All elements of the shown amplifier are arranged in or along one plane (being the drawing plane, or the x-z plane coordinate system shown in FIG. 3).

The beam formed by the incoming pulses (seed pulses) is assumed to be polarized in the specified plane, i.e. in the x-direction as indicated by the vertical lines. After its passing of the Faraday isolator 12, the polarization remains x-oriented. The HR coating and the mirrors M3, M4, M5 direct the beam on four passes P1, P2, P3, P4 through the amplifier on in each case slightly different beam paths shown by the full black lines. After four passes, the beam hits the retro-reflecting mirror M6, whereafter the beam makes for more passes P5, P6, P7, P8 through the crystal on the path way but backward. The Faraday isolator separates the incoming beam from the output beam: After the second pass through the Faraday rotator, the beam is polarized in y-direction as indicated by the dots shown for the output beam in the figure.

The waist position 31 of the beam, preferably for all passes, is outside the gain element. This is achieved by positioning the collimation lens L1 at the particular distance from the second gain element as will be explained in more detail.

The second amplifier (or power radiation amplifier) may be set up in the same manner as the first amplifier. It may as an alternative be set up differently. In the shown embodiment, the second amplifier comprises a 4-pass optical scheme analogous to the scheme of the first amplifier, but without retro-reflecting mirror M6 and, as a consequence, without the need for the Faraday isolator.

Referring to FIG. 4, the beam paths scheme is illustrated in somewhat more detail. The main idea behind is as follows: The collimated Gaussian beam hits the lens L1, L2 at a certain small angle and at some distance from the lens center. The beam is pointed towards the pump area of the gain crystal. It converges behind the lens, with the waist being at the distance $f_{L1,L2}$ from the lens. Due to initial non-90° angle of incidence, the waist of the seed Gaussian beam has an off-axis position with respect to the optical axis of the amplifier. Downstream of the focal point, the beam diverges, then hits the gain crystal. Passing through the gain crystal, the beam experiences the change of its wavefront due to a positive thermal lens effect. Approaching the HR facet of the crystal from inside, the beam is nearly collimated again and is reflected from the HR coating back into the crystal under a certain angle with respect to the incident beam. It now travels in the reverse direction, experiences the influence of the thermal lens again and hits the lens L1, L2 on another side and at the same distance from the amplifier optical axis as compared to the input beam. Thus the beam geometrically reproduces itself with transverse displacement after two passes through the amplifier. The third and fourth passes do the same but with a larger transverse displacement at the lens L1, L2. Due to very low effective numerical aperture of the entire cone of rays between the lens L1 and the gain element (less than 0.03 in a preferred embodiment) the Gaussian beam faces the thermal lens under a very small angle and, therefore, may experience only minor, insubstantial distortion while passing through the gain crystal that does not affect, noticeably, the (often desired) TEMoo beam quality.

The thermal lens formed in the gain element (which arises automatically when the gain element is optically pumped, due to the radial heat distribution in the element) is considered as an important part of the optical scheme. The distance between the collimating lens L1, L2 and the main plane of the formed thermal lens tl is chosen to correspond approximately to the sum of the focal lengths $f_{L1,L2}$ and $f_{tl}$ of the collimating lens and of the thermal lens. Thus the beam waist position 31 is adjusted to be outside of the gain element at the distance from the gain crystal approximately equal to the focal length of the thermal lens. It has been found that the above described geometry of the amplifier with a Gaussian beam waist position outside the gain element and vertex of the ray cone coinciding with HR surface of the gain crystal to be an advantageous as compared to any other geometries of a spatial amplifier (for example described in Forget et al, OSA TOPS V.68, ASSL, 2002 p. 321-323, Müller et al., OSA TOPS V.83, ASSL, 2003 p. 278-284), since it compromises all the requirements listed previously herein.

FIG. 5 shows the beam path scheme of FIG. 4 in a unfolded illustration (i.e., reflection by highly reflecting (HR) coating illustrated as transmission), where the gain element 14, 24 is shown twice. α denotes the angle of incidence for the first pass, β for the third pass.

Figure 6:
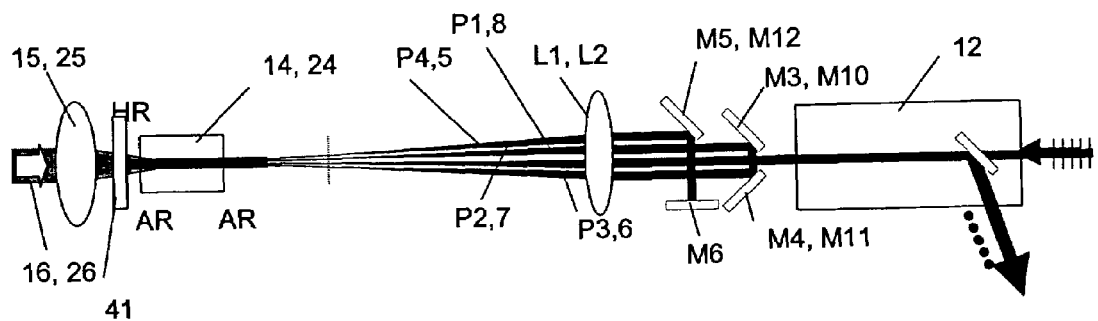
FIG. 6 is a diagram of an alternative embodiment of an amplifier according to the invention.

FIG. 6 illustrates an alternative embodiment of the (first and/or second) amplifier where the gain element 14, 24 does not comprise an HR coating but AR coatings on both sides. Instead, a separate mirror element 41 is shown, which is highly reflecting for the radiation wavelength and is translucent for the pump radiation wavelength. The further elements of FIG. 6 correspond to the elements of FIG. 3 and are not described again here.

In an embodiment, where the amplifier gain element 14, 24 is a Nd:Vanadate (i.e. Nd:YVO$_4$), the central radiation wavelength may be 1064 nm, and the pump radiation wavelength approximately 808 nm. Of course, the seed laser has to operate at substantially the same center wavelength. Preferably, the seed laser's gain element (the first gain element) therefore comprises the same dopant. Especially preferred is an apparatus, where the first, the second, and if available, the third or further gain elements are of the same material.

Figure 7:
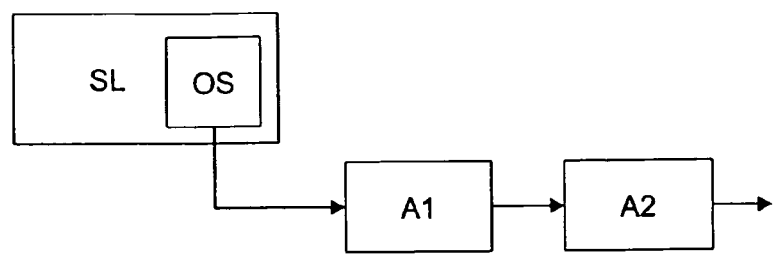
FIG. 7 is a block diagram of an alternative apparatus according to the invention.

FIG. 7 shows an apparatus in accordance with the second aspect of the invention. The seed laser SL comprises an optical switch OS integrated in the cavity and on a beam path in the seed laser cavity. The light pulses coupled out by the optical switch are directed to a first amplifier A1, and a second amplifier A2.

Figure 8:
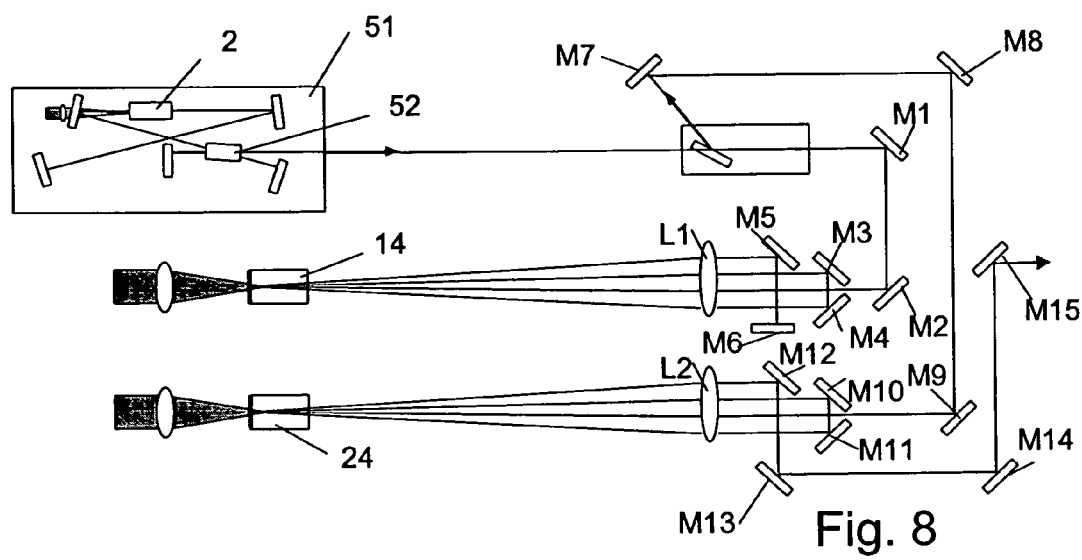
FIG. 8 is a diagram of an embodiment of the alternative apparatus according to the invention.

FIG. 8 shows a diagram of an embodiment of the apparatus of FIG. 7. The oscillator cavity of the seed laser 51 comprises an integrated optical switch 52—which may be an electro-optical switch, an acousto-optical switch or a magneto-optical switch. The optical switch couples the pulse travelling back and forth in the cavity out at regular intervals and directs it to the first amplifier. The first and second amplifier in the embodiment of FIG. 8 correspond to the first and second amplifier of FIG. 2.

It is to be noted that the above description merely shows examples of ways to carry out the invention and should by no means construed to be limiting. Especially, the shown geometrical arrangements as well as number and nature of optical appliances such as mirrors etc. may vary in many ways. The skilled person will for example know many ways to configure (concerning the folding etc.) a seed laser oscillator and will, given the teaching provided herein, find many ways to set up an amplifier or a plurality of amplifiers in accordance with the invention. It is also by no means a requirement that the seed oscillator need physically be separated. Rather, in order to conserve space, they can be amalgamated with crossing or nearly crossing beam paths etc.

Although all shown embodiments comprise two amplifiers, the second amplifier is optional and may be omitted. It is especially not necessary where the application does not demand the average power to be constant for different settings (such as pulse repetition frequency etc.) and where the pulse energy does not have to be necessarily maximized. Similarly, a third or more power amplifiers could be added for applications requiring higher average power.

In the figures, for reasons of simplicity, the coupling of the pump radiation source with the gain elements is not shown. In principle, any known or to be developed way of coupling pump radiation into the gain element is possible. A way to be mentioned in particular is the use of the fiber coupled laser diode bars as a pump source, since it allows very effective pumping with perfect spatial distribution of the pump radiation and simplified mode-matching technique.

Various other embodiments may be envisaged without departing from the spirit and scope of the invention.

The apparatus, amplifier and method according to the invention may be used in many contexts. Next to the mentioned material processing applications, also nonlinear optical devices are applications of choice, since they require high energy densities. An example is the combination of the apparatus according to the invention with nonlinear crystals to produce picosecond pulses at shorter or longer wavelengths than the seed laser wavelength.

What is claimed is:

1. An apparatus for generating electromagnetic radiation pulses comprising
   a mode-locked laser oscillator comprising an oscillator cavity defining an oscillator beam path, a first gain element, first pumping means for pumping said first gain element, and a mode locker, and being operable to produce a train of seed electromagnetic radiation pulses;
   an optical switch placed outside of the oscillator beam path and being arranged in a beam path of radiation coupled out from the oscillator, the optical switch operable to couple radiation from a switch input into a switch output during a certain time period or certain time periods;
   a radiation amplifier including a second gain element, the radiation amplifier being arranged in a beam path of radiation radiated from the switch output, the radiation amplifier further including second pumping means, the second pumping means comprising a continuous-wave pump radiation source; and
   a power radiation amplifier including a third gain element and third pumping means for the third gain element, the power radiation amplifier being arranged in a beam path of radiation output from the radiation amplifier, wherein the average output power of the radiation amplifier is adjusted to the gain material saturation value of the third gain material and the number of passes of the beam path through the third gain material, and wherein the power radiation amplifier, in a normal operation mode of the apparatus, is operated in or near saturation.

2. The apparatus according to claim 1, the continuous-wave pumping radiation source comprising a diode laser.

3. The apparatus according to claim 1, the radiation amplifier being a multi-pass amplifier, wherein radiation traverses the second gain element a plurality of times.

4. The apparatus according to claim 3, wherein the amplifier comprises at least one radiation deflection arrangement, and wherein radiation traverses the second gain element a pre-defined number of times, which number is defined by the at least one radiation deflection arrangement.

5. The apparatus according to claim 1, wherein the second gain element comprises an Nd doped material.

6. The apparatus according to claim 5, wherein the second gain element comprises Nd:vanadate material.

7. The apparatus according to claim 1, wherein the seed electromagnetic radiation pulses have a pulse length exceeding 1 ps and being below 1 µs.

8. The apparatus according to claim 1, wherein the optical switch is an acousto-optical switch.

9. The apparatus according to claim 1, wherein the optical switch is an electro-optical switch.

10. The apparatus according to claim 1, wherein the mode locker includes a saturable absorber.

11. The apparatus according to claim 1, wherein the amplifier has a small signal gain exceeding 500.

12. The apparatus according to claim 1, wherein the radiation amplifier is a non-closed path radiation amplifier.

13. The apparatus according to claim 1, wherein the third pumping means comprise a continuous-wave pump radiation source.

14. The apparatus according to claim 13, the third pumping means comprising a diode laser.

15. The apparatus according to claim 1, the third gain element being a Nd doped solid-state gain element.

16. The apparatus according to claim 1, the power radiation amplifier being a multi-pass amplifier, where the third gain element is passed a pre-defined number of times, the pre-defined number being greater than 1.

17. An apparatus according to claim 1, wherein the radiation amplifier comprises at least one radiation deflection arrangement capable of causing the radiation to traverse the second gain element a pre-defined number of times, wherein said pre-defined number is at least four.

18. The apparatus according to claim 1, wherein the radiation is caused to traverse the third gain element a pre-defined number of times, wherein said pre-defined number is at most four.

19. A radiation pulse generator comprising:
a pulsed seed laser operable to produce a train of seed electromagnetic radiation pulses;
an optical switch placed in a beam path of radiation output from the seed laser, the optical switch operable to couple radiation from a switch input into a switch output during a certain time period or certain time periods;
a radiation amplifier including a second gain element being a solid-state gain element which includes an Nd dopant, the radiation amplifier being arranged in a beam path of radiation from the switch output, the radiation amplifier further including second pumping means, the second pumping means comprising a continuous-wave pump radiation source, the pump radiation source comprising at least one laser diode; and
a power radiation amplifier including a third gain element and third pumping means for the third gain element, the power radiation amplifier being arranged in a beam path of radiation output from the radiation amplifier, wherein the average output power of the radiation amplifier is adjusted to the gain material saturation value of the third gain material and the number of passes of the beam path through the third gain material, and wherein the power radiation amplifier, in a normal operation mode of the apparatus, is operated in or near saturation.

20. The radiation pulse generator according to claim 19, the optical switch comprising an acousto-optical modulator.

21. The radiation pulse generator according to claim 19, the radiation amplifier being a spatial multi-pass amplifier, wherein radiation traverses the second gain element a predefined number of times due to a radiation deflection arrangement possibly including polarization sensitive and/or polarization influencing means.

22. An apparatus for generating electromagnetic radiation pulses comprising:
a mode-locked laser oscillator comprising an oscillator cavity defining an oscillator beam path, a first gain element, first pumping means for pumping said first gain element, and a mode locker, and being operable to produce a train of seed electromagnetic radiation pulses;
an optical switch placed outside of the oscillator beam path and being arranged in a beam path of radiation coupled out from the oscillator the optical switch operable to couple radiation from a switch input into a switch output during a certain time period or certain time periods;
a spatial multi-pass radiation amplifier including a second gain element being a Nd:Vanadate gain element, the radiation amplifier being arranged in a beam path of radiation from the switch output, the radiation amplifier further including second pumping means, the second pumping means comprising a continuous-wave pump radiation source, the pump radiation source including at least one laser diode; and
a spatial power radiation amplifier including a third gain element and a continuous-wave optical pump for pumping said third gain element, the power radiation amplifier being arranged in a beam path of radiation output from the radiation amplifier, wherein the average output power of the radiation amplifier is adjusted to the gain material saturation value of the third gain material and the number of passes of the beam path through the third gain material, and wherein the power radiation amplifier, in a normal operation mode of the apparatus, is operated in or near saturation.

23. An apparatus for generating electromagnetic radiation pulses comprising:
a mode-locked laser oscillator comprising an oscillator cavity, a first gain element, first pumping means for pumping said first gain element, and a mode locker,
a radiation amplifier including a second gain element, which second gain element includes Nd doped gain material, the radiation amplifier further including second pumping means, the second pumping means comprising a continuous-wave pumping radiation source;
an optical switch, the optical switch operable to couple seed radiation pulses from the laser oscillator into the radiation amplifier; and
a power radiation amplifier including a third gain element and third pumping means for the third gain element, the power radiation amplifier being arranged in a beam path of radiation output from the radiation amplifier, wherein the average output power of the radiation amplifier is adjusted to the gain material saturation value of the third gain material and the number of passes of the beam path through the third gain material, and wherein the power radiation amplifier, in a normal operation mode of the apparatus, is operated in or near saturation.

24. The apparatus according to claim 23, the second pumping means including a laser diode.

25. The apparatus according to claim 23, the seed radiation pulses having a pulsewidth between 1 ps and 1 µs.

26. The apparatus according to claim 23, the second gain material being absent any active cooling means in direct contact with the second gain material.

27. The apparatus according to claim 23, the optical switch being placed inside the oscillator cavity in a oscillator cavity beam path.

28. A method of generating high-energy electromagnetic radiation pulses, the method comprising the following steps:
generating a train of seed electromagnetic radiation pulses, of a first pulse repetition frequency;
picking a fraction of pulses from said train of seed electromagnetic radiation pulses, said fraction of pulses having a second pulse repetition frequency being smaller than the first pulse repetition frequency;
continuously irradiating a doped solid by pump electromagnetic radiation;
directing said fraction of pulses onto said doped solid, so that said doped solid is traversed by said fraction of pulses;
re-directing said fraction of pulses so that the doped solid is traversed by said fraction of pulses at least one further time;
wherein the fraction of pulses traverses said doped solid on a non-closed path;
irradiating a further doped solid by pump electromagnetic radiation; and
directing said fraction of pulses onto said further doped solid, wherein a power of said fraction of pulses caused to be at a value where the further doped solid is operated in or near saturation.

29. An amplifier for producing a train of amplified electromagnetic radiation pulses upon incidence of a train of seed electromagnetic radiation pulses, the amplifier comprising a radiation directing arrangement defining a radiation entry and a radiation exit and further comprising a gain element and continuous-wave optical pumping means operable to optically pump the gain element, the radiation directing arrangement operable to direct incident radiation onto the gain element and to re-direct, on a non-closed path, radiation at least after a first traversal of the gain element onto the gain element, the gain element forming, in an operational state, a thermal lens, wherein a beam waist of a radiation beam directed by the radiation directing arrangement comprises a beam waist outside of the gain material.

30. The amplifier according to claim 29, the radiation directing arrangement focussing the radiation beam on every traversal, so that the radiation beam comprises a beam waist for every traversal, wherein each beam waist is outside of the gain material.

31. The amplifier according to claim 29, the radiation directing arrangement comprising a single optical lens, the amplifier being, with the exception of the thermal lens, free of any additional lenses.

32. The amplifier according to claim 29, wherein the gain element is an Nd doped solid.

33. The amplifier according to claim 32, the gain element comprising Nd:Vanadate material.

34. An amplifier according to claim 29, the gain element being free of any active cooling means in direct contact with the gain element.

35. An amplifier according to claim 29, the radiation directing arrangement comprising a Faraday isolator and a retro-reflecting mirror, the radiation directing arrangement directing radiation incident on the Faraday isolator after a number of first passes through the gain element, to the retro-reflecting mirror, and after the same number of second passes to the Faraday isolator, the Faraday isolator letting the radiation after the first and second passes pass to an outside of the amplifier.

36. An amplifier according to claim 29, the radiation directing arrangement accounting for a spatial separation of the beams on different passes.

37. An amplifier according to claim 36, the radiation directing arrangement further comprising a polarization-dependent beam separator for separating input and output beams.

38. An amplifier according to claim 37, comprising an anisotropic gain element where a polarization plane of amplification corresponds to one of the optical axes of the element, the polarization-dependent beam separator being a Faraday isolator for polarization-dependent separation of input and output beams.

39. An amplifier according to claim 29, wherein the non-closed path lies substantially in a single plane.

* * * * *